United States Patent [19]
Scott

[11] 4,308,503
[45] Dec. 29, 1981

[54] PHASE SHIFT KEYED DEMODULATOR USING RECOVERED CARRIER WITH CONTROLLED PHASE OFFSET

[75] Inventor: Richard P. Scott, Woodbridge, England

[73] Assignee: Post Office, London, England

[21] Appl. No.: 85,233

[22] Filed: Oct. 16, 1979

Related U.S. Application Data

[63] Continuation-in-part of Ser. No. 903,254, May 5, 1978, abandoned.

[30] Foreign Application Priority Data

May 12, 1977 [GB] United Kingdom ............... 20084/77

[51] Int. Cl.³ ...................... H03D 3/06; H04L 27/22
[52] U.S. Cl. ...................... 329/50; 329/122; 375/84; 375/120
[58] Field of Search .................. 329/50, 110, 112, 122, 329/124; 375/83–87, 118–120

[56] References Cited

U.S. PATENT DOCUMENTS

| | | | |
|---|---|---|---|
| 3,826,990 | 7/1974 | Pera | 329/50 |
| 3,835,404 | 9/1974 | Nakamura et al. | 329/104 |
| 4,027,265 | 5/1977 | Kobayashi et al. | 329/122 |
| 4,074,119 | 2/1978 | Steinert et al. | 329/104 X |
| 4,088,832 | 5/1978 | Eastmond | 375/87 X |
| 4,100,499 | 7/1978 | Monrolin | 329/50 |
| 4,218,771 | 8/1980 | Hogge, Jr. | 375/120 |

FOREIGN PATENT DOCUMENTS 2216259 10/1973 Fed. Rep. of Germany ........ 375/86

*Primary Examiner*—Siegfried H. Grimm
*Attorney, Agent, or Firm*—Kemon & Estabrook

[57] ABSTRACT

This invention relates to an adaptive demodulator for use in a phase shift keyed microwave communication system. The adaptive demodulator improves the system error rate at a particular carrier to noise ratio by monitoring the output of the demodulator and optimizing the phase offset of the carrier signal recovered in the demodulator to provide a high output. A particular example continuously varies the phase offset of the recovered carrier signal about the highest output value to track variations in the optimum phase offset.

8 Claims, 5 Drawing Figures

PHASE SHIFT KEYED DEMODULATOR USING RECOVERED CARRIER WITH CONTROLLED PHASE OFFSET

RELATED APPLICATION

This application is a continuation-in-part of my earlier application Ser. No. 903,254 filed May 5, 1978, now abandoned.

FIELD OF THE INVENTION

This invention relates to a method and apparatus for improving the system error rate at a particular carrier to noise ratio in receiving apparatus of phase shift keyed microwave communication systems. The invention has particular application to four-phase phase shift keyed microwave systems.

BACKGROUND OF THE INVENTION

In phase shift keyed systems, several factors contribute to the degradation of the signal and lead to an increase in the system error rate at a particular carrier to noise ratio, some of these occur as the result of the propagation of the microwaves from a transmitter to a receiver, and some as a result of the apparatus used in the receiver. An amplitude versus frequency slope across the symbol-rate band width of a transmission system, which is usually caused by frequency selective fading across the pass band of the channel, causes distortion of the received signal which results in a reduced pulse amplitude out of a demodulator apparatus used in the receiver due to the generation of quadrature components during demodulation. Another factor is the linear group-delay variation resulting from reflections taking place during the transmission of the signal from the transmitter to the receiver. The receiver then receives both a direct signal and an indirect, reflected signal and there is a phase difference between these two signals which, on recombination may reduce the absolute signal level of the received signal but which, in any event, generates quadrature components of the received carrier vector in the demodulator apparatus which again reduces the pulse amplitude out of the demodulator so that, it is more difficult to differentiate between noise and the received information. Both of the above factors are caused by conditions subsisting during the transmission of the signal from the transmitter to the receiver.

In the past, the receiver has included means to recover a carrier signal from the incoming phase shift modulated signal and the demodulator apparatus has applied a fixed phase offset to the recovered carrier signal before applying it to the demodulator apparatus as a phase reference for all phase locked states of the recovered carrier. In four-phase phase shift keyed systems, there are four locked states of the recovered carrier signal. In the past, this offset between the recovered phase of the carrier and the phase to be used for demodulation purposes has been determined experimentally in the laboratory and then pre-set into the equipment. In practice, the optimum phase offset differs from the laboratory estimation and, this leads to a phase error between the incoming signal and the reference signal used for demodulation purposes. This phase error reduces the level of the demodulated signal and this again reduces the demodulated signal to noise ratio and this increases the system error rate. Finally, the phase offset applied by the demodulator apparatus varies as a result of the carrier signal recovery means of the demodulator apparatus, tracking frequency variations of the received signal. Frequency variations occur in the received signal and frequency variations also occur in a voltage controlled oscillator forming part of the carrier recovery means due to variations in the temperature. These variations between the frequency of the received signal and the recovered carrier signal result in changes in the phase offset which are proportional to the frequency error.

It can be shown theoretically that about 40% of the signal degradation measured in dB, caused by amplitude slope and about 60% of the signal again measured in dB, caused by the linear group-delay variation can be recovered by varying the phase of the recovered carrier at the receiver for a given error rate. Further, degradation caused by phase offset changes originating in the demodulator apparatus could be recovered by varying the phase offset applied to the recovered carrier signal by the demodulator apparatus.

It is therefore a primary object of this invention to provide a demodulator apparatus in which the phase offset applied to the recovered carrier signal is variable.

It is another object of this invention to provide a demodulator apparatus in which the phase offset of the recovered carrier signal is varied to optimise the amplitude of the output of the demodulator.

It is a further object of the invention to provide a demodulator apparatus in which the demodulated output signal is monitored and the phase offset varied to maximise the demodulated output signal.

SUMMARY OF THE INVENTION

According to a first aspect of this invention, a demodulation apparatus for use in a phase shift keyed microwave communication system comprises carrier signal recovery means for recovering a carrier from a modulated signal and having a first input for receiving a phase shift modulated input signal, a second input for receiving a phase change signal, and an output for outputting a recovered carrier signal; demodulation means for demodulating a modulated carrier, having a first input for said phase shift modulated signal, a second input for said recovered carrier signal, and an output for demodulated signals; monitoring means having an input for said demodulated signal, and an output for outputting a signal dependent upon the amplitude of the demodulated signal applied to its input; control means, having an input connected to said output of said monitoring means and an output, for outputting a phase change signal; means connecting said output of said carrier signal recovery means to said second input of said demodulation means; means connecting said output of said demodulation means to said input of said monitoring means; and means connecting the output of said control means to said second input of said carrier signal recovery means whereby said signal applied to said second input of said carrier signal recovery means controls the phase of said recovered carrier signal to maintain said output from said demodulation means at a high level.

The carrier signal recovery means may include variable phase shift means as an integral part of its circuit and, in this case, the output signal from the monitoring means is applied to the variable phase shift part of the carrier signal recovery means. However, it is preferred that the apparatus includes a carrier signal recovery unit and a variable phase offset means having a first input for said recovered carrier signal, a second input for said output of said control means, and an output for outputting said recovered carrier signal with a varied phase offset; means connecting the recovered carrier signal from said unit to said first input of said variable phase offset means; means connecting said output of said variable phase shift means to said second input of said demodulation means; and means connecting said second input of said variable phase offset means to said output of said control means.

The output from the monitoring means may feed a bank of signal level detectors with the output of the signal level detectors feeding a ramp generator whose output controls the variable phase shift part of the carrier recovery circuit or the variable phase offset means. In this case the first of the bank of level detectors operates to start a sweep of the ramp generator on detecting a predetermined level of input signal from the monitoring means, a second of the bank of level detectors operates to end the sweep of the ramp generator when the output of the monitoring means is lower than a predetermined value, and a third of the bank of level detectors operates to reverse the direction of the sweep of the ramp generator when the phase offset applied to the recovered carrier signal decreases the signal detected by the monitoring means.

Preferably the monitoring means comprises a differential amplifier having a first inverting input supplied with a predetermined reference signal, and a second, non-inverting input connected to the output of the demodulation means.

It is preferred that said control means includes a threshold circuit; a ramp generator; a ramp sweep reversing circuit; means connecting the threshold circuit to the output of the monitoring means; and means connecting the output of the threshold circuit to the ramp generator through the sweep reversing circuit, whereby as the output of the monitoring means drops to the threshold value the threshold circuit triggers the sweep of the ramp generator which in turn leads to a change in the phase offset induced by the variable phase shift part of the carrier signal recovery means or the variable phase offset means until the output from the monitoring means once again drops to the predetermined threshold value when the sweep is again reversed. In this way the phase offset induced by the phase shift part of the carrier signal recovery means or the variable phase offset means is caused to oscillate continuously about the optimum position. In this way it follows any changes in the optimum position of the phase offset.

According to a second aspect of this invention a method of optimising the phase position of a carrier signal recovered from a phase shift modulated signal to maximise the pulse amplitude of said signal on demodulation comprises recovering a carrier signal from said phase shift modulated input signal, demodulating said phase shift modulated input signal by reference to the phase of said recovered carrier signal, monitoring the amplitude of said demodulated signal derived by reference to the phase of said recovered carrier signal, and controlling the phase of said recovered carrier signal in dependence upon said monitored amplitude of said demodulated output signal to maintain said amplitude at a high value.

BRIEF DESCRIPTION OF THE DRAWING

A particular example of a demodulation apparatus in accordance with the present invention for demodulating a four-phase phase shift keyed microwave signal will now be described with reference to the accompanying drawings; in which.

DESCRIPTION OF THE INVENTION

Figure 1:
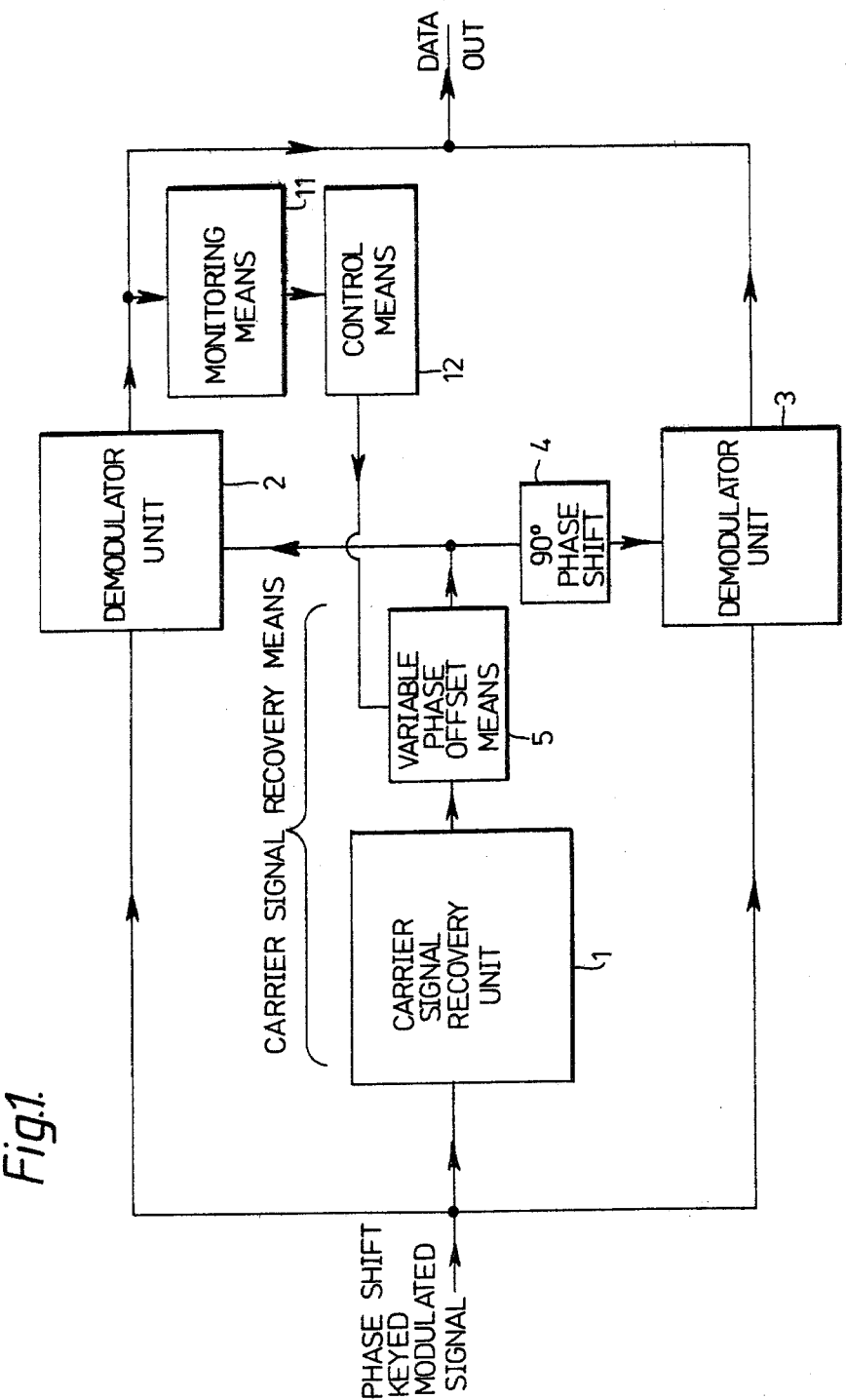
FIG. 1 is a simplified block diagram of the demodulation apparatus.

In the demodulation apparatus shown in FIG. 1 a phase shift keyed modulated input signal is applied to a carrier signal recovery means and to two demodulator units 2 and 3 which take an output from the carrier signal recovery means as their phase reference. The phase reference to the demodulator unit 3 has a 90° phase shift element 4. The phase shift keyed modulated input signals applied to the demodulator units 2 and 3 are demodulated with reference to the recovered carrier signal in the demodulator unit 2 and with reference to a signal which differs by 90° from the recovered carrier signal in demodulator unit 3. The output from the demodulator units 2 and 3 are then combined to provide a data output from the apparatus.

Figure 2:
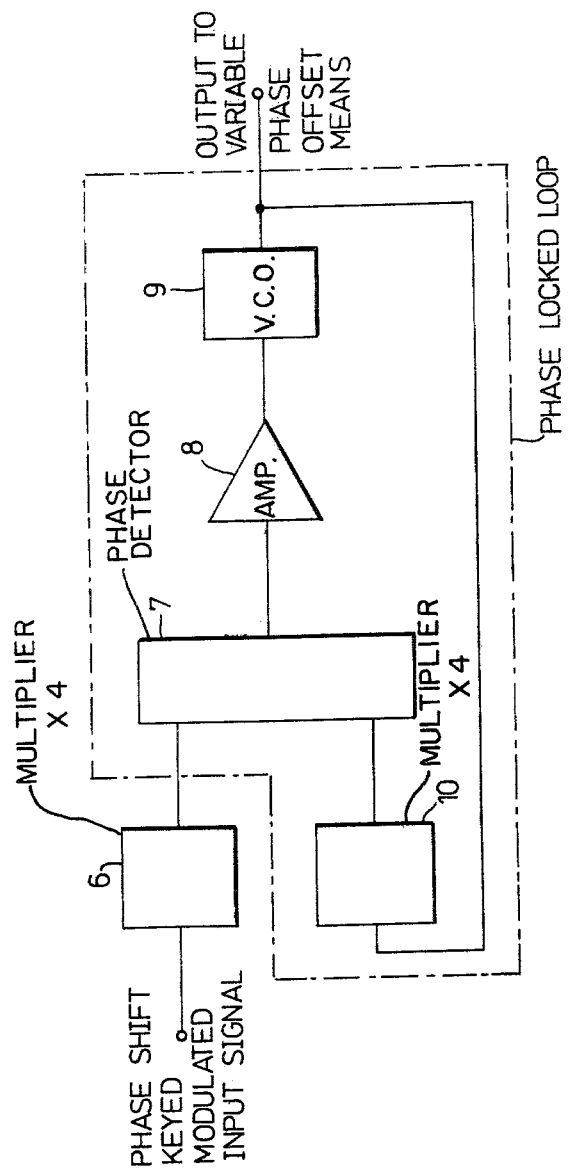
FIG. 2 is a block diagram of the carrier signal recovery unit.
Figure 3:
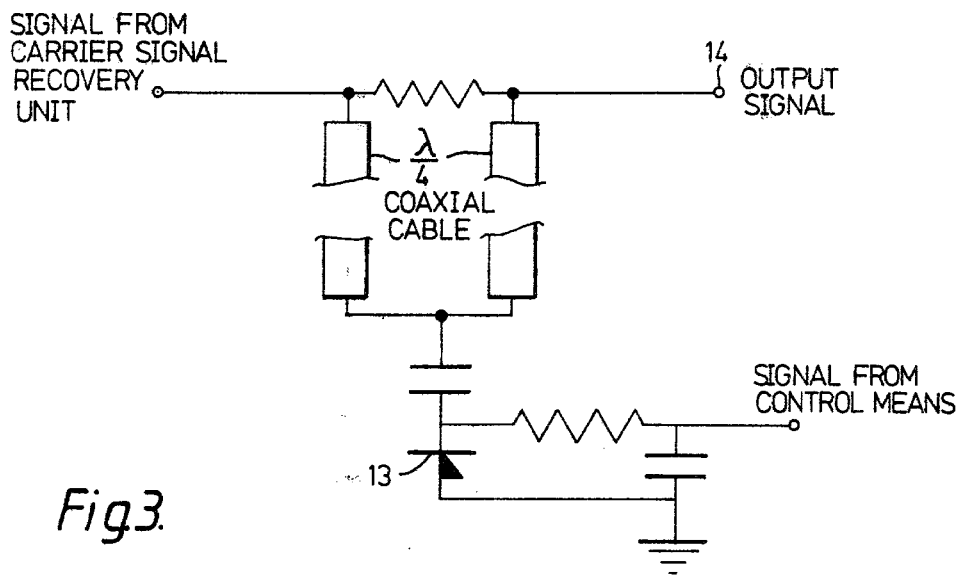
FIG. 3 is a circuit diagram of the variable phase offset means.

The carrier signal recovery means is formed by a carrier signal recovery unit 1 which is a conventional multiplicative type carrier recovery circuit and illustrated in more detail in FIG. 2, and a variable phase offset means 5 which is illustrated in more detail in FIG. 3. The carrier signal recovery unit 1 comprises an input to which the phase shift keyed modulated signal is applied connected to a multiplier 6 which multiplies the input signal by a factor of four to remove the four phase modulation from it. The multiplier output is a single frequency at four times the intermediate frequency. The output from the multiplier is tracked by a phase locked loop formed by a phase detector 7, an amplifier 8, a voltage controlled oscillator 9 and a multiplier 10. The output of the voltage controlled oscillator which forms the recovered carrier signal, is multiplied in the multiplier 10 by a factor of four and this is compared with the output of the multiplier 6 in the phase detector 7 to produce an error signal which is amplified and used as the input to the voltage controlled oscillator 9. This type of carrier signal recovery unit is fully described and discussed on pages 255 and 256 of "Theory of Synchronous Communications" by J. J. Stiffler, published by Prentice-Hall Inc. in 1971.

In addition to this conventional carrier signal recovery unit 1, the apparatus in accordance with this invention includes a variable phase offset means as part of the carrier signal recovery means and this is connected to the output of the carrier signal recovery unit 1. This variable phase offset means 5 is under the control of a monitoring means 11 and a control means 12. The monitoring means 11 is connected to the output of the demodulator unit 2 and it monitors the output from the demodulator unit 2 and inputs a signal into the control means 12. The control means 12 controls the variable phase offset means 5 to optimise the phase offset applied to the recovered carrier signal emitted by the carrier signal recovery unit 1 to provide the optimum output from the demodulator unit 2. Since there is a fixed phase offset of 90° between the phase reference applied to the demodulator units 2 and 3 and since the input phase shift keyed modulated signal is a four-phase signal with a fixed 90° phase difference between its components, the output from the demodulator unit 3 is also optimised.

The variable phase offset means 5 is shown in more detail in FIG. 3 and is of the reflexion type in which a hybrid coupler has its normal output terminated in a reactance. The input signal from the carrier signal recovery unit 1 is applied to the normally isolated port of the hybrid coupler and the control signal from the control means 12 is applied to a varactor diode 13 forming the reactance. The output signal from the variable phase offset means appears on terminal 14. As the potential applied to the varactor diode 13 is varied, its capacitance varies and hence the phase offset of the output signal varies. The variable phase offset means 5 may include buffer amplifiers to eliminate any effect of changing the phase offset on the carrier signal recovery unit 1 and to prevent the demodulator units 2 and 3 from affecting the variable phase offset means 5.

Figure 4:
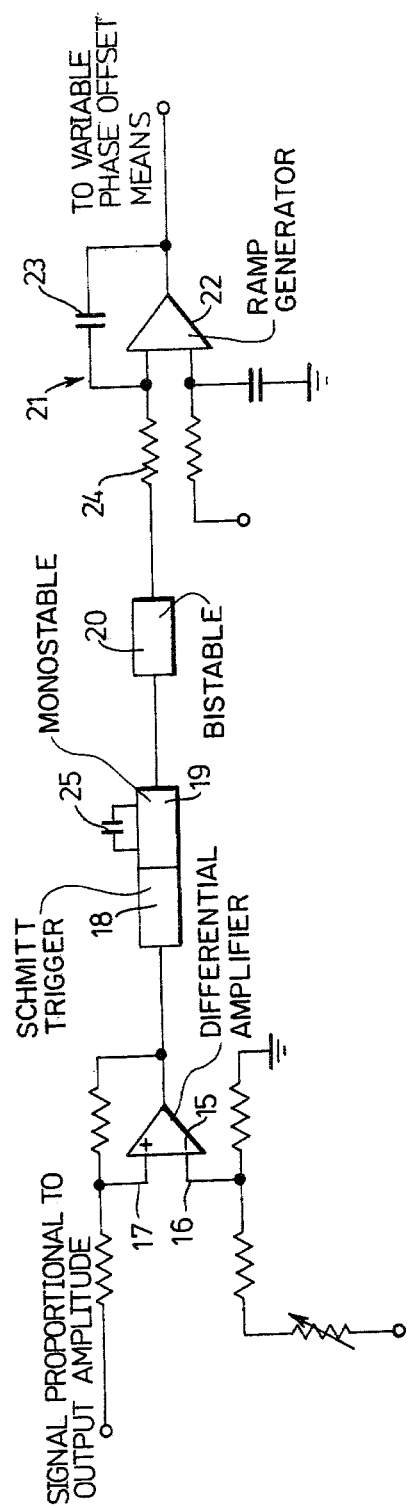
FIG. 4 is a circuit diagram of a monitoring and control portion of the demodulation apparatus; and, FIG. 5 is a graph illustrating the operation of the apparatus.

The monitoring means 11 and control means 12 are shown in more detail in FIG. 4. The monitoring means 11 comprises a differential amplifier 15 having a reference signal applied to its inverting input 16 and a signal proportional to the output of the demodulation unit 2 applied to its non-inverting input 17. The output from the differential amplifier 15 is applied to a Schmitt trigger circuit 18 and a monostable circuit 19 which are combined in a single integrated circuit package. The output from the monostable circuit 19 is applied to a bistable circuit 20, again in the form of an integrated circuit package, and thence to a ramp generator in the form of an integrating circuit 21. The integrating circuit 21 includes an operational amplifier 22 with a capacitive feedback network provided by the capacitor 23 and a resistor 24 in series with the input of the operational amplifier 22 and the output from the bistable circuit 20. The output from the operational amplifier 22 is applied to the variable phase offset means 5 which is responsive to an increase of the voltage applied to it to increase the phase offset induced. The bistable circuit 20 reverses the sweep of the ramp generator circuit formed by the integrating circuit 22 each time that it toggles.

The differential amplifier 15 is formed by an operational amplifier type 741 manufactured by Marconi-Elliot Microelectronics Ltd. the combined Schmitt trigger 18 and monostable circuit 19 is formed by an integrated circuit package SN 74121 manufactured by Texas Instruments Ltd. Typical values of the resistors 24 and the capacitor 23 are 100 Kilohms and 1 microfarad respectively.

Figure 5:
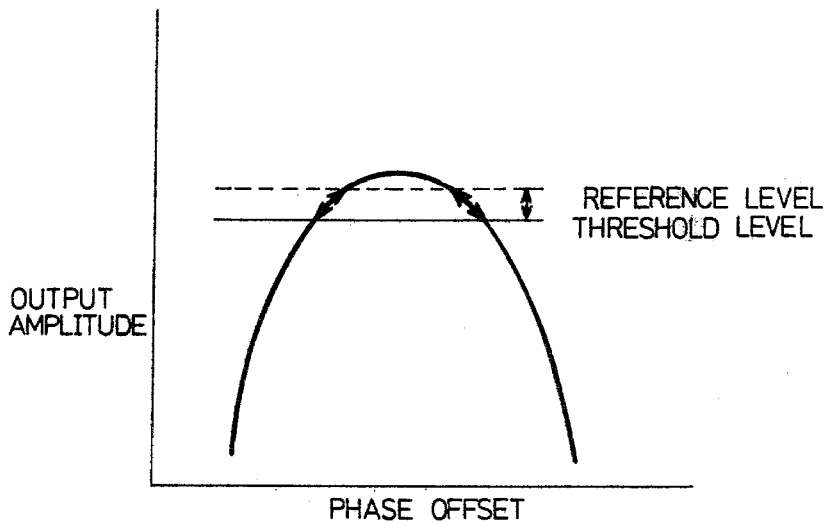

In operation, the output from the integrating circuit 21 gradually increases or gradually decreases depending upon the initial state of the bistable circuit 20. This gradual increase or decrease causes the variable phase offset means 5 to vary the phase offset applied to the recovered carrier signal emitted by the carrier signal recovery unit 1. As this phase offset changes, the output from the demodulator unit 2 eventually starts to fall and this output is monitored by the differential amplifier 15. The signal applied to the non-inverting input 17 of the differential amplifier 15, eventually reaches the same level and then falls below that of the reference signal applied to the inverting input 16. This causes the output of the differential amplifier 15 to go negative and, when this reaches the threshold level of the Schmitt trigger circuit 18 the Schmitt trigger circuit changes its state and causes the monostable circuit 19 to output a pulse of predetermined length. The duration of the output pulse from the monostable circuit 19 may be varied by varying the value of a capacitor 25. The output pulse from the monostable circuit 19 causes the bistable circuit to toggle and this change of state reverses the direction of sweep of the integrating circuit 21. Thus, if the output of the operational amplifier 22 is decreasing the change in state of the bistable circuit 20 causes it to start increasing and vice versa. This change in the direction of sweep of the output of the operational amplifier 22 causes the phase offset induced by the variable phase offset means 5 to change and the direction of change to reverse. The sweep of the integrating circuit 21 continues until the output from the demodulator unit 2 once again falls so that the signal applied to the non-inverting input 17 of the differential amplifier 15 falls below the reference level. Thus the phase offset applied by the variable phase offset means 5 oscillates about the optimum phase offset position and thus tracks any changes in the optimum phase offset that occur during use. This sequence of operations is illustrated in FIG. 5.

It is possible to monitor the output from the demodulator unit 3 as well as the demodulator unit 2. In this case the monitoring means 11 may be arranged to form an average of the outputs from the units 2 and 3 and apply a signal proportional to this average value to the control means 12.

Further, it is also possible to provide separate monitoring means 11, control means 12, and variable phase offset means 5 for each demodulator unit 2 and 3. In this case, the output from the carrier signal recovery unit is applied to both of the variable phase offset means 5 and each of these is controlled in dependence upon the output from its corresponding demodulator unit 2 or 3. Such a system can accommodate and compensate for any error in the 90° phase offset between the two demodulator units 2 and 3 or in the phase offset initially encoded into the signal.

The demodulation apparatus in accordance with this invention requires little in the way of initial setting up. Thus it is possible to inter-change demodulator apparatus readily during maintenance of the system without elaborate and complex adjustments being required.

I claim:

1. A demodulation apparatus for use in a phase shift keyed microwave communication system comprising:

carrier signal recovery means for recovering a carrier from a modulated signal and having a first input for receiving a phase shift modulated input signal, a second input for receiving a phase change signal, and an output for outputting a recovered carrier signal;

demodulation means for demodulating a modulated carrier, having a first input for said phase shift modulated signal, a second input for said recovered carrier signal, and an output for demodulated signals;

amplitude monitoring means having an input for said demodulated signal, and an output for outputting a signal dependent upon the amplitude of the demodulated signal applied to its input;

control means, having an input connected to said output of said amplitude monitoring means and an output, for outputting a phase change signal;

means connecting said output of said carrier signal recovery means to said second input of said demodulation means;

means connecting said output of said demodulation means to said input of said amplitude monitoring means; and means connecting the output of said control means to said second input of said carrier signal recovery means whereby said signal applied to said second input of said carrier signal recovery means controls the phase of said recovered carrier signal to maintain said output from said demodulation means at a high level.

2. The demodulation apparatus of claim 1 wherein said carrier signal recovery means includes a carrier signal recovery unit and a variable phase offset means having a first input for said recovered carrier signal, a second input for said output of said control means and an output for outputting said recovered carrier signal with a varied phase offset;

means connecting the recovered carrier signal from said unit to said first input of said variable phase offset means;

means connecting said output of said variable phase offset means to said second input of said demodulation means; and means connecting said second input of said variable phase offset means to said output of said control means.

3. The demodulation apparatus of claim 2, wherein said amplitude monitoring means includes a differential amplifier having an inverting input, and a non-inverting input, and an output: said input of said amplitude monitoring means being connected to said non-inverting input of said differential amplifier; a reference signal source; and means connecting said reference signal source to said inverting input of said differential amplifier.

4. The demodulation apparatus of claim 3, wherein said control means includes a threshold circuit; a ramp generator means and sweep reversing means to change the direction of sweep of said ramp generator means; means connecting the output of said differential amplifier to said threshold circuit; means connecting the output from said threshold circuit to said sweep reversing means; and means connecting said sweep reversing means to said ramp generator means, whereby the direction of the sweep of the ramp generator means is reversed each time said differential amplifier monitors a drop in said output from said demodulation means to said reference level.

5. The demodulation apparatus of claim 4 wherein said threshold circuit is a Schmitt trigger and a monostable circuit connected in series.

6. The demodulation apparatus of claim 4, wherein said sweep reversing means is a bistable circuit.

7. The demodulator apparatus of claim 4, wherein said ramp generator means includes an integrating circuit formed by an operational amplifier having a capacitive feedback network.

8. A method of optimising the phase position of a carrier signal recovered from a phase shift modulated signal to maximise the pulse amplitude of said signal on demodulation comprising recovering a carrier signal from said phase shift modulated input signal, demodulating said phase shift modulated input signal by reference to the phase of said recovered carrier signal, monitoring the amplitude of said demodulated signal derived by reference to the phase of said recovered carrier signal, and controlling the phase of said recovered carrier signal in dependence upon said monitored amplitude of said demodulated output signal to maintain said amplitude at a high value.

* * * * *